(12) United States Patent
Lee et al.

(10) Patent No.: US 10,829,107 B1
(45) Date of Patent: Nov. 10, 2020

(54) GEAR ACTUATOR CONTROL METHOD FOR TRANSMISSION OF VEHICLE

(71) Applicants: Hyundai Motor Company, Seoul (KR); Kia Motors Corporation, Seoul (KR)

(72) Inventors: Geon Tae Lee, Ansan-si (KR); Min Ki Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/544,001

(22) Filed: Aug. 19, 2019

(30) Foreign Application Priority Data

May 9, 2019 (KR) .................. 10-2019-0054277

(51) Int. Cl.
*F16H 59/02* (2006.01)
*B60W 20/30* (2016.01)
*B60W 10/10* (2012.01)
*F16H 61/12* (2010.01)
*F16H 61/02* (2006.01)

(52) U.S. Cl.
CPC ............ *B60W 20/30* (2013.01); *B60W 10/10* (2013.01); *F16H 59/0204* (2013.01); *F16H 2061/0227* (2013.01); *F16H 2061/1268* (2013.01)

(58) Field of Classification Search
None
See application file for complete search history.

(56) References Cited

U.S. PATENT DOCUMENTS 10,279,673 B2 * 5/2019 Tsukizaki .............. B60W 30/19
2019/0301600 A1 * 10/2019 Matsuura ............ F16H 61/0403

FOREIGN PATENT DOCUMENTS

KR 10-2014-0052384 A 5/2014

* cited by examiner

*Primary Examiner* — Dirk Wright
(74) *Attorney, Agent, or Firm* — Morgan, Lewis & Bockius LLP

(57) ABSTRACT

A method may include a data collection operation; a data-processing; a type determination operation in which the controller analyzes a pattern of the processed data to determine a type of pattern from among predetermined reference patterns; an STS calculation operation in which the controller is configured to determine an STS; a map selection operation in which the controller is configured to select a control map among a plurality of control maps on the basis of an LTS determined by accumulating the STS; and a gear-shifting operation in which the controller performs gear shifting using the selected controller map.

16 Claims, 8 Drawing Sheets

| change of pattern during number of times corresponding to first reference number | calculated value | STS |
|---|---|---|
| aaa | −0.6 x 3 = −1.8 | −2 |
| bbb | 0.3 x 3 = 0.6 | 2 |
| ccc | −0.2 x 3 = −0.6 | −2 |
| bbc | 0.3 x 2 − 0.2 x 1 = 0.4 | 0.4 |
| bdd | 0.3 x 1 − 0 x 2 = 0.3 | 0.3 |

GEAR ACTUATOR CONTROL METHOD FOR TRANSMISSION OF VEHICLE

CROSS REFERENCE TO RELATED APPLICATION

The present application claims priority of Korean Patent Application No. 10-2019-0054277 filed on May 9, 2019, the entire contents of which is incorporated herein for all purposes by this reference.

BACKGROUND OF THE INVENTION

Field of the Invention

The present invention relates to a method of controlling a gear actuator of a transmission in a vehicle, and more particularly, to a technology that controls a gear actuator used for an automated manual transmission (AMT), a dual-clutch transmission (DCT), or the like mounted in a vehicle.

Description of Related Art

An AMT or a DCT is provided with a synchromesh-based gear-shifting mechanism, such as a conventional manual transmission. A clutch that controls the power from an engine is driven by a clutch actuator. Switching a gearshift is implemented by a selecting actuator which is in charge of selection and a shifting actuator which is in charge of shifting. The selecting actuator and the shifting actuator together are referred to as a gear actuator.

A controller may shift a gear by controlling the clutch actuator and the gear actuator according to the situation that a vehicle is in while driving. Accordingly, to smoothly perform gear shifting, the gear actuator needs to be accurately controlled with a high responsiveness to a control signal from the controller.

However, the operation of the gear actuator may be affected by the operating environment, such as the temperature of a transmission, the voltage provided from the vehicle, or the like, and thus, a deviation from the perspective of the operating environment may occur; for example, control responsiveness and accuracy may be changed. Also, a deviation from the perspective of structure may occur, for example, the control responsiveness and accuracy may be changed due to a cause, which is generated during processes of manufacturing and assembling the transmission and the gear actuator and is inherent in the structure. The actual behavior of the gear actuator in a response to the same control signal from the controller may be different for each vehicle, and may be different depending on the operating environment. Depending on the case, the time period spent on gear shifting may be long since the response speed of the gear actuator is low. Since gear shifting fails due to overshoot during a selection operation, gear shifting may need to be attempted again. Since overshoot occurs during a shifting operation, shift shock may occur.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method of controlling a gear actuator of a transmission in a vehicle, in which a controller actively changes the control characteristics of the gear actuator to compensate for structurally caused deviation of the operation of the gear actuator due to a structural cause generated during processes of manufacturing and assembling the transmission and the gear actuator or operating-environment-related deviation of the operation of the gear actuator which is caused by the temperature of the transmission and the voltage provided from the vehicle, so that gear shifting may be smoothly and reliably performed and a shift shock may be prevented.

In accordance with an aspect of the present invention, there is provided a method of controlling a gear actuator of a transmission in a vehicle, the method including: a data collection operation in which, when gear shifting is performed, a controller is configured to collect data related to a change in a stroke of a shift finger over time as the gear actuator is driven; a data-processing operation in which the controller is configured to process the collected data; a type determination operation in which the controller analyzes a pattern of the processed data to determine the type of pattern from among predetermined reference patterns; a short term score (STS) calculation operation in which the controller repeatedly performs operations from the data collection operation to the type determination operation a number of times corresponding to a first reference number, and determines an STS according to each type of pattern determined during the repetition performed the number of times corresponding to the first reference number; a map selection operation in which the controller is configured to select a control map among a plurality of control maps on the basis of a long term score (LTS) calculated by accumulating the STS; and a gear-shifting operation in which the controller perform gear shifting of the transmission, using the selected controller map.

The data-processing operation may include: primary processing, which converts the collected data plotted on orthogonal coordinates, of which a horizontal axis and a vertical axis represent a time and a stroke, respectively, wherein the horizontal axis is converted into an error axis representing a difference from a desired control value for the stroke of the shift finger and the vertical axis is converted into a speed axis indicating the speed of a movement of the shift finger; secondary processing, which performs log-scale conversion of the horizontal axis obtained by the primary processing; and tertiary processing which multiplies, by a weight, each of the vertical axis and the horizontal axis of data obtained through the secondary processing to convert the vertical axis and the horizontal axis to have a same predetermined size.

The operation of analyzing the pattern may include: designating two predetermined points N1 and N2 on the orthogonal coordinates on which data processed in the data-processing operation are plotted; moving the two designated points using K-NN clustering; and comparing the final locations of the two designated points with predetermined reference points to determine the type of pattern.

The operation of moving the two designated points using the K-NN clustering is performed repeatedly a number of times corresponding to a second reference number.

The reference points include a total of three points, one of the three points is located farthest from an origin of the orthogonal coordinates, and two remaining points of the three points are located in the center portion of the horizontal axis and the center portion of the vertical axis, respectively.

The reference patterns are configured to include a first pattern indicating a state in which a responsiveness of the shift finger is lower than a first predetermined value and a speed of the shift finger is lower than a predetermined speed, a second pattern, in which the responsiveness of the shift finger is higher than the first predetermined value but overshoot of the responsiveness occurs, a third pattern, indicating a state in which initial responsiveness is higher than a second predetermined value but operation of the shift finger stops before a desired stroke of the shift finger is achieved and the operation of the shift finger starts again, and a fourth pattern, indicating a normal state in which the responsiveness of the shift finger and the overshoot of the responsiveness are optimized; and the controller is configured to compare the locations of the two designated points N1 and N2 with the three reference points and determines the type of pattern from among the four reference patterns.

When the types of patterns, determined during repeatedly performing the operations the number of times corresponding to the first reference number, are the same, the controller may determine, to be the STS, a minimum value that enables a subsequent control map adjacent to the current control map to be selected in the map selection operation.

When not all of the types of patterns, determined during repeatedly performing the operations the number of times corresponding to the first reference number, are the same, the controller is configured to determine the STS using a predetermined pattern value assigned for each reference pattern.

According to an exemplary embodiment of the present invention, a controller actively changes the control characteristics of a gear actuator to compensate for structurally caused deviation of the operation of the gear actuator, which is caused by a structural cause generated during processes of manufacturing and assembling the transmission and the gear actuator, or operating-environment-related deviation of the operation of the gear actuator, which is caused by the temperature of the transmission and the voltage provided from a vehicle, so that gear shifting may be smoothly and reliably performed and a shift shock may be prevented.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
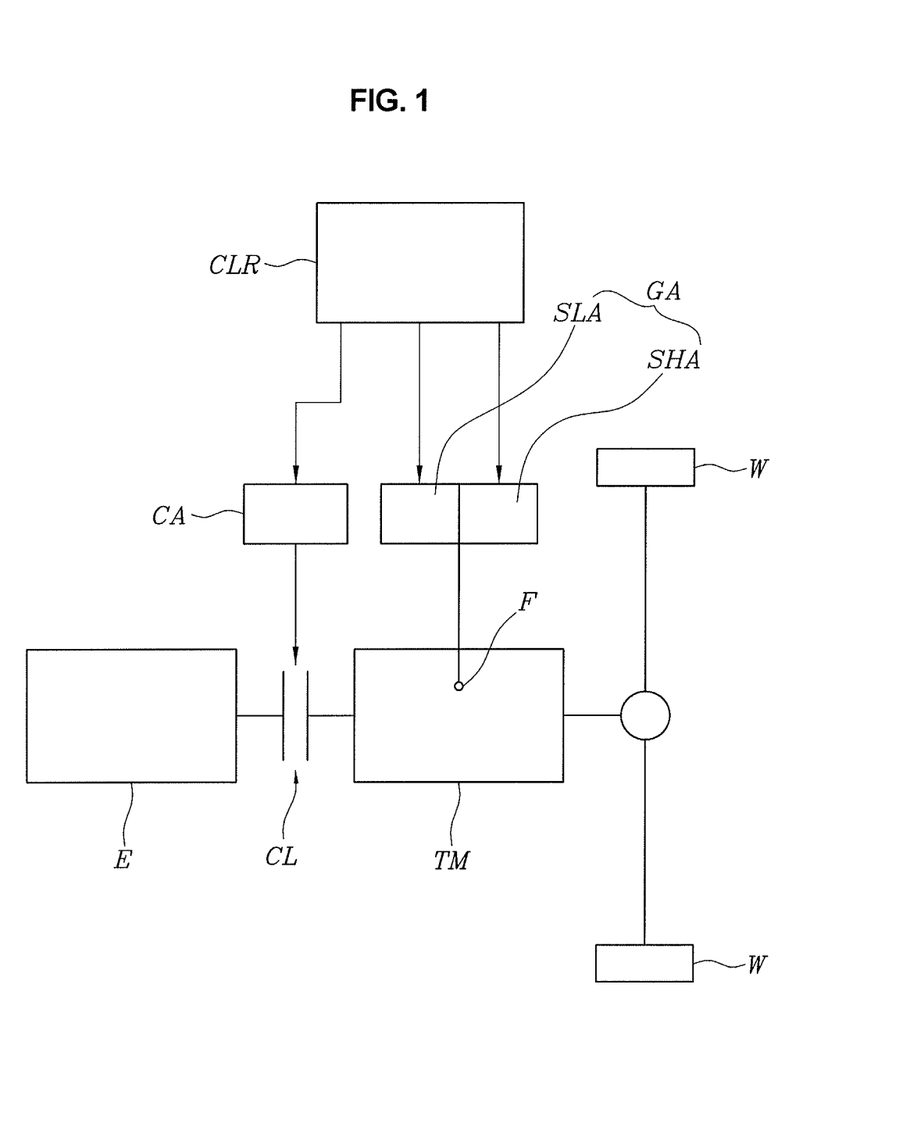
FIG. 1 is a diagram illustrating the configuration of a vehicle provided with an AMT to which an exemplary embodiment of the present invention is applicable.

FIG. 1 is a diagram illustrating the configuration of a vehicle provided with an AMT to which an exemplary embodiment of the present invention is applicable. The power of an engine (E) is transferred to an AMT, which is a transmission (TM), via a clutch (CL), and power obtained by gear shifting is output to a driving wheel (W).

The clutch (CL) is controlled by a clutch actuator (CA). The transmission (TM) is configured to change a gearshift by a movement of a shift finger (F) driven by a gear actuator (GA) including a selecting actuator (SLA) and a shifting actuator (SHA) to perform gear shifting. The clutch actuator (CA) and the gear actuator (GA) are configured to be controlled by a controller (CLR).

The controller (CLR) may be implemented as a transmission control unit (TCU) or the like. The engine (E) may be configured to be controlled by a separate engine control unit (ECU) or the like.

Figure 2:
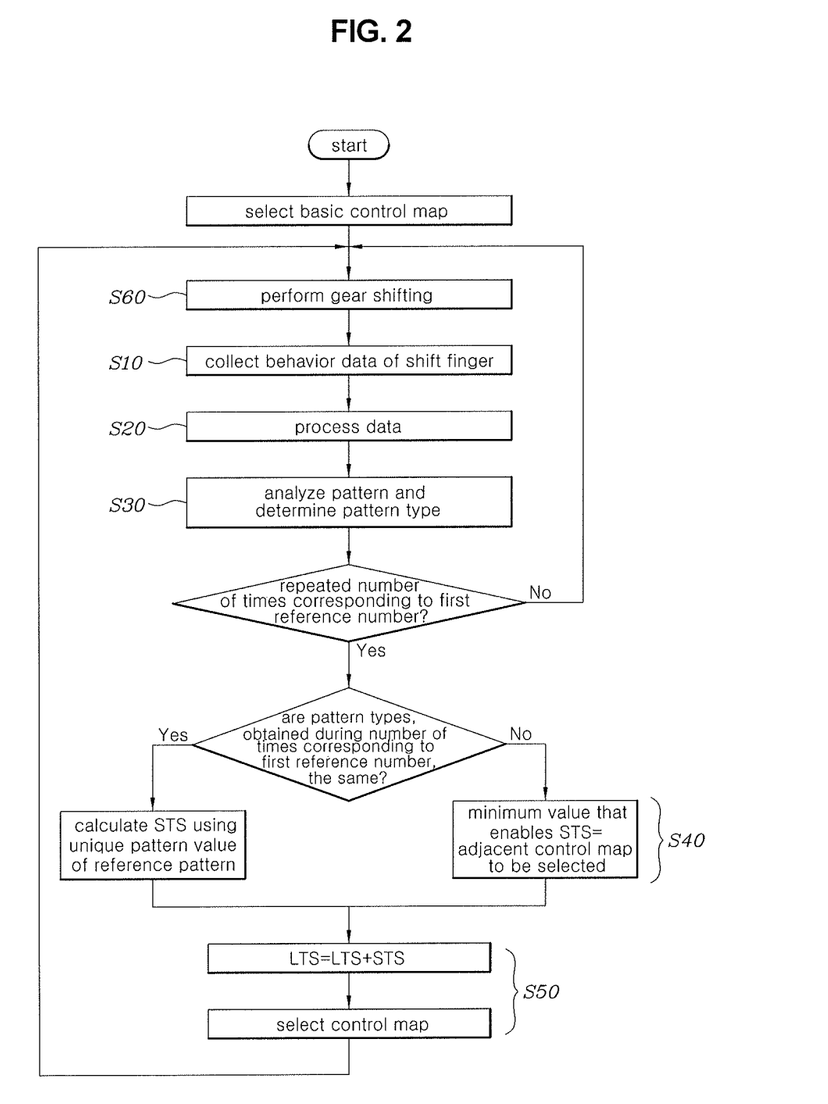
FIG. 2 is a flowchart illustrating an exemplary embodiment of a method of controlling a gear actuator of a transmission in a vehicle according to an exemplary embodiment of the present invention.

Referring to FIG. 2, an exemplary embodiment of a method of controlling a gear actuator of a transmission (TM) of a vehicle is configured to include: a data collection operation S10 in which, when gear shifting is performed, a controller (CLR) collects data associated with a change in a stroke of a shift finger (F) over time as the gear actuator is driven; a data-processing operation S20 in which the controller (CLR) processes the collected data; a type determination operation S30 in which the controller (CLR) analyzes a pattern of the processed data to determine the type of pattern from among predetermined reference patterns; an STS determination operation S40 in which the controller (CLR) repeatedly performs operations from the data collection operation S10 to the type determination operation S30 a number of times corresponding to a first reference number and determines a short-term score (STS) according to each type of pattern determined during the repetition performed a number of times corresponding to the first reference number; a map selection operation S50 in which the controller (CLR) selects one of a plurality of control maps on the basis of a long-term score (LTS) calculated by accumulating the STS; and a gear-shifting operation S60 in which the controller (CLR) performs gear shifting using the selected controller map.

That is, the present invention analyzes data associated with movement of the shift finger (F), collected while performing gear shifting, determines an STS and an LTS according to the type of pattern to which the movement of the shift finger (F) belongs among predetermined reference patterns, automatically selects a control map to be used for performing further gear shifting according to the LTS, and performs gear shifting using the newly selected control map for further gear shifting. Therefore, the present invention is configured for actively compensating for structurally caused deviation and operating-environment-related deviation of the operation of the gear actuator to perform smooth and reliable gear shifting and to prevent a shift shock, improving the marketability of a vehicle.

When the ignition of the engine (E) is turned on and control according to the disclosure begins, the controller (CLR) selects a basic control map which is basically set, performs gear shifting using the basic control map when further gear shifting is performed, performs the data collection operation S10, and sequentially performs subsequent operations.

Subsequently, when a new control map is selected in the map selection operation S50, the controller performs gear shifting using the new control map and repeats the operations from the data collection operation S10, and thus, suitable and smooth gear shifting may be continuously performed in a response to a change in the operating environment, which varies as the driving time of the vehicle increases.

In practice, the present invention is separately applied to selecting control and shifting control. The present invention separately collects stroke data associated with a selection operation of the shift finger (F) by the selecting actuator (SLA) and stroke data associated with a shifting operation of the shift finger (F) by the shifting actuator (SHA), separately performs subsequent operations, and separately selects control maps to be used for the selecting control and shifting control by the shift finger (F). However, the technical idea of the present invention associated with selecting control and shifting control are the same. For ease of description, a description is provided without distinguishing between selecting control and shifting control.

The data collected in the data collection operation S10 may be plotted on the orthogonal coordinates, of which the horizontal axis and the vertical axis represent a time and a stroke, respectively. The data-processing operation S20 may include: primary processing, which converts the collected data, wherein the horizontal axis is converted into an error axis representing a difference from a desired control value for the stroke of the shift finger (F) and the vertical axis is converted into a speed axis representing the speed of movement of the shift finger (F); secondary processing which performs log-scale conversion of the horizontal axis obtained through the primary processing; and tertiary processing, which multiplies, by a weight, each of the vertical axis and the horizontal axis of data obtained through the secondary processing to convert the vertical axis and the horizontal axis to have the same predetermined size.

Figure 3:
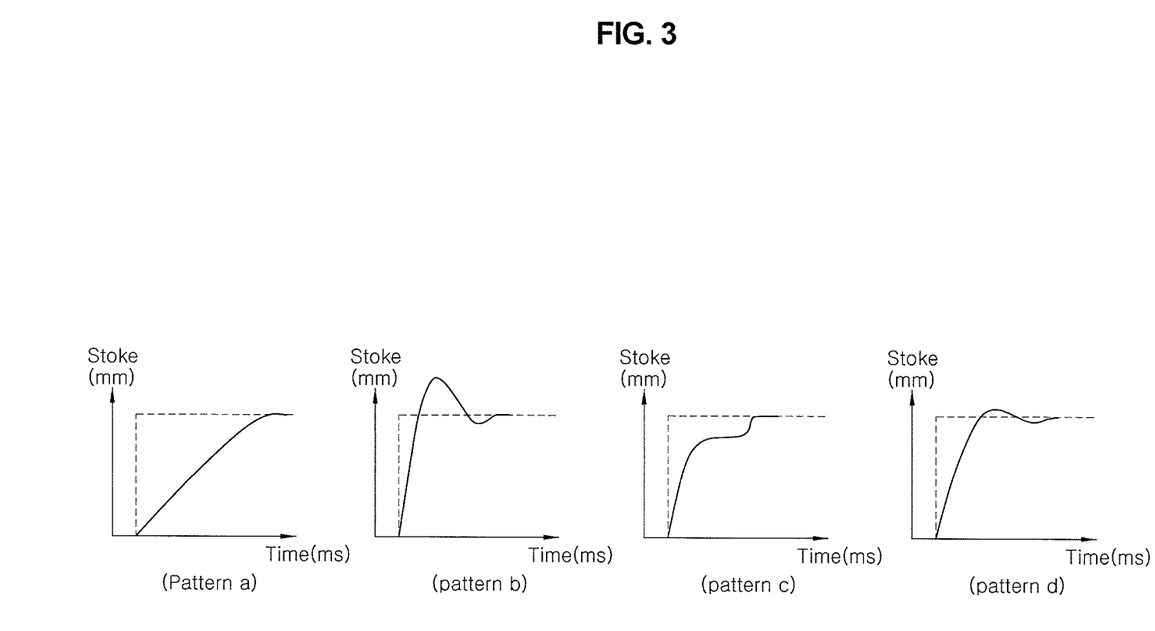
FIG. 3 is a diagram illustrating reference patterns used In an exemplary embodiment of the present invention.

For ease of description of the data-processing operation S20, the reference patterns used in the pattern determination operation S30 will be described with reference to FIG. 3. The reference patterns may be configured to include pattern a, indicating a state with low responsiveness and low speed of the shift finger (F), pattern b, indicating a state in which responsiveness is high but overshoot occurs, pattern c, indicating a state in which initial responsiveness is high but operation thereof stops before a desired stroke is achieved and the operation starts again, and pattern d, indicating a normal state in which the responsiveness of the shift finger and the overshoot of the responsiveness are optimized.

Figure 4:
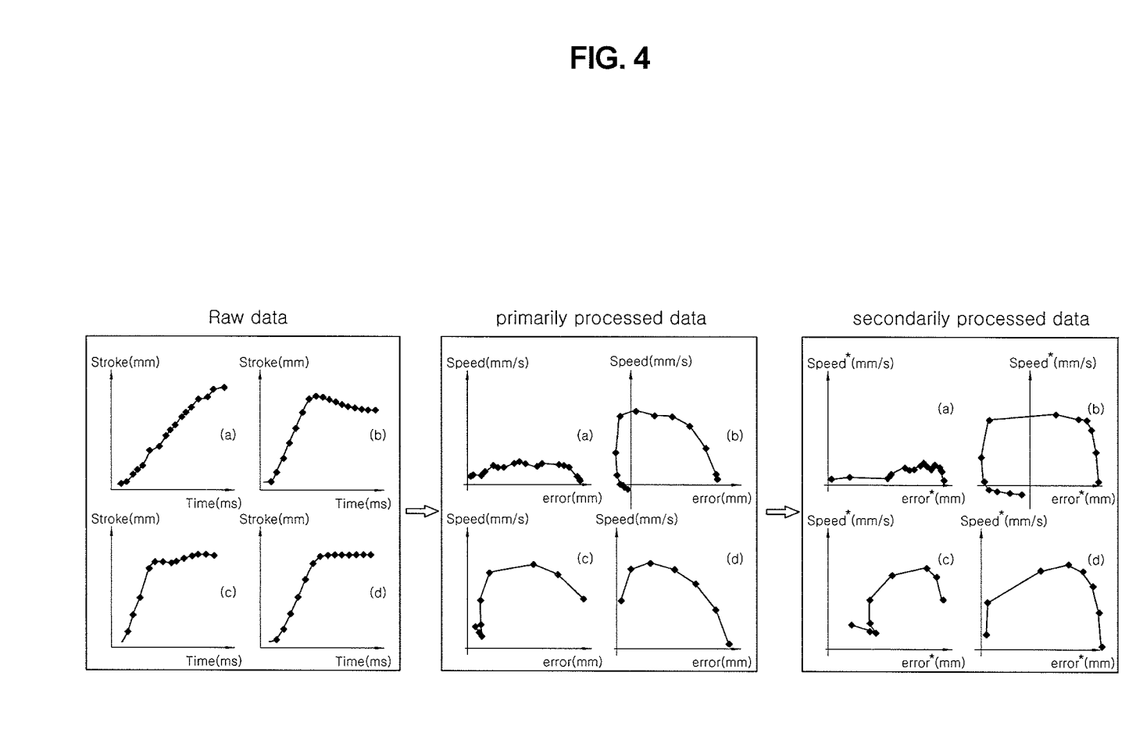
FIG. 4 is a diagram illustrating primary processing and secondary processing of a data-processing operation of the present invention.

FIG. 4 illustrates the state in which the primary processing and the secondary processing of the data-processing operation S20 are performed, with respect to a total of four cases, such as the case in which the data collected via the data collection operation S10 is collected as pattern a, the case in which the data is collected as pattern b, the case in which the data is collected as pattern c, and the case in which the data is collected as pattern d.

As described above, in the primary processing, the error may be obtained by subtracting the collected data from the desired control value for the stroke. The speed may be calculated on the basis of the stroke and the time between two adjacent pieces of data. The secondary processing may perform log scale conversion according to Equation 1 below.

$$error^* = \begin{cases} \log(\alpha \times error), & \text{when, } error > 0 \\ 0 & \text{when, } error = 0 \\ -\log(\alpha \times error), & \text{when, } error < 0 \end{cases} \quad \text{[Equation 1]}$$

error: desired control value for stroke—collected DATUM(stroke)

error*: error obtained by log scale conversion according to secondary processing $\alpha$: resolution of motor used for selecting actuator (SLA) or shifting actuator (SHA)

The primary processing and secondary processing of the collected data are performed to accurately determine the type of pattern via pattern analysis. Referring to FIG. 4, it is recognized that the two graphs in the upper portion are clearly distinguished after the primary processing but that the two graphs in the lower portion are not clearly distinguished. However, after the secondary processing, the two graphs in the lower portion are also clearly distinguished. Accordingly, when the data obtained after the secondary processing is used, the type of pattern is accurately determined via the pattern analysis.

Therefore, any method that can clearly distinguish data collected in a form of four reference patterns on orthogonal coordinates may be used as the primary processing and secondary processing of the data-processing operation S20, in addition to the above-described method.

After the secondary processing, via the tertiary processing which multiplies, by a weight, each of the vertical axis and the horizontal axis of data obtained through the secondary processing, the vertical axis and the horizontal axis are converted to have the same predetermined size. For example, according to an exemplary embodiment of the disclosure, a weight may be applied to each axis so that the axes may have the same size, such as horizontal axis 2 and vertical axis 2.

The tertiary processing is performed to perform pattern analysis in the future. The graph of FIG. 5 is a graph of the state in which the maximum size of the horizontal axis and the maximum size of the vertical axis are limited to 2 by the tertiary processing.

The pattern analysis includes: designating two predetermined designated points N1 and N2 on the orthogonal coordinates on which data processed in the data-processing operation S20 are plotted; moving the two designated points using a K-Nearest Neighbor (K-NN) clustering; and comparing final locations of the two designated points with predetermined reference points to determine the type of pattern.

Figure 5:
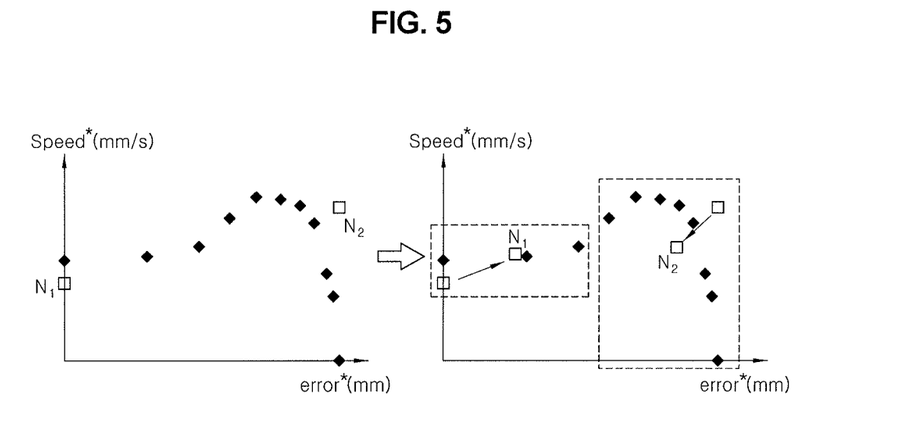
FIG. 5 and FIG. 6 are diagrams illustrating pattern analysis of the present invention.

As shown in the first graph of FIG. 5, locations spaced from each other may be designated as the two designated points N1 and N2, in addition to the processed data plotted on the orthogonal coordinates via the data-processing operation S20. The designated locations need to be spaced from each other. Also, empirically, locations that enable accurate classification of the type of pattern may be set.

As described above, using the K-NN clustering, the pattern analysis operation clusters all data on the graph into two data groups to which the two designated points belong, and moves the two designated points N1 and N2 to the centers (i.e., average) of the respective data groups.

In the present instance, the operation of moving the two designated points using the K-NN clustering may be repeatedly performed a number of times corresponding to a second reference number.

That is, by setting the second reference number to 3, the operation of moving the two designated points using the K-NN clustering is performed three times, and thus clustering is performed accurately.

As described above, after moving the two designated points using the K-NN clustering, the type of pattern of the corresponding data is determined. According to an exemplary embodiment of the present invention, a total of three reference points is used, one of the three points is located farthest from the origin point of the orthogonal coordinates, and the remaining two points are located in the center portion of the horizontal axis and the center portion of the vertical axis, respectively.

Figure 6:
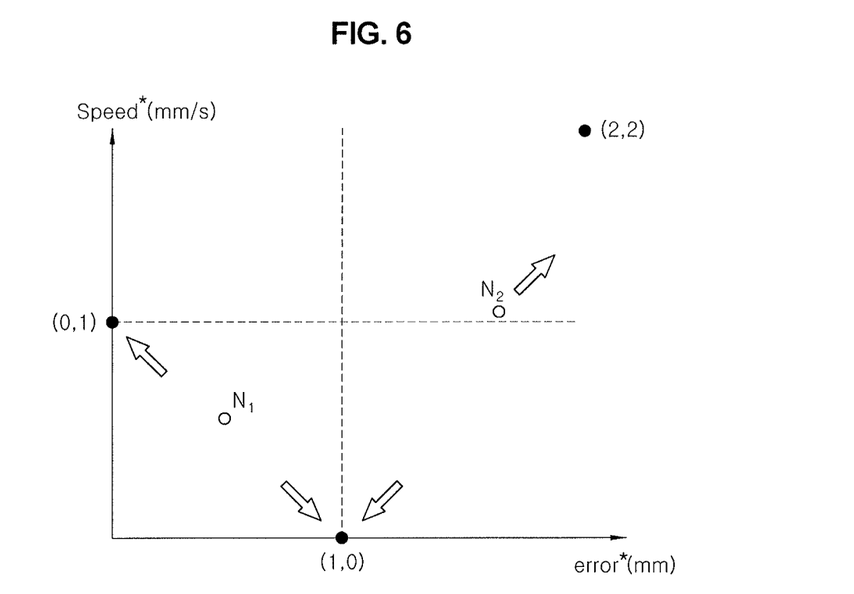

That is, the reference points are (2, 2), (0, 1), and (1,0), as shown in FIG. 6.

Referring to FIG. 6, in the state in which the reference points are mounted as shown in the drawing, the locations of the two designated points N1 and N2, which are finally moved using the K-NN clustering, are compared with the three reference points, and the type of pattern is determined from among the four reference patterns.

That is, the type of pattern is determined on the basis of the two designated points N1 and N2, according to the following criteria.

If (d[N1-(0,1)]>d[N1-(1,0)] AND d[N2-(2,2)]>d[N2-(1, 0)]) is satisfied, the type of pattern is pattern a;

if (d[N1-(0,1)]<d[N1-(1,0)] AND d[N2-(2,2)]>d[N2-(1, 0)]) is satisfied, the type of pattern is pattern b;

if (d[N1-(0,1)]>d[N1-(1,0)] AND d[N2-(2,2)]<d[N2-(1, 0)]) is satisfied, the type of pattern is pattern c; and if (d[N1-(0,1)]<d[N1-(1,0)] AND d[N2-(2,2)]<d[N2-(1, 0)]) is satisfied, the type of pattern is pattern d.

Here, d[N1-(0,1)] indicates the shortest distance from the designated point N1 to the reference point (0,1).

In the STS calculation operation S40, the data collection operation S10 to the type determination operation S30 are repeatedly performed a number of times corresponding to a first reference number. This is to prevent a control map from frequently changing and to provide more reliable controllability. For example, the first reference number may be set to 3.

In the STS calculation operation S40, the controller (CLR) determines the STS by distinguishing the case in which all pattern types, determined during repeatedly performing the operations the number of times corresponding to the first reference number, are the same from the case in which not all pattern types are the same.

That is, when all pattern types, determined during repeatedly performing the operations the number of times corresponding to the first reference number, are the same, the minimum value that enables a subsequent control map adjacent to the current control map to be selected is determined to be the STS in the map selection operation S50. If not all pattern types, determined during repeatedly performing the operations the number of times corresponding to the first reference number, are the same, the STS is determined using a unique pattern value assigned for each reference pattern.

Figure 7:
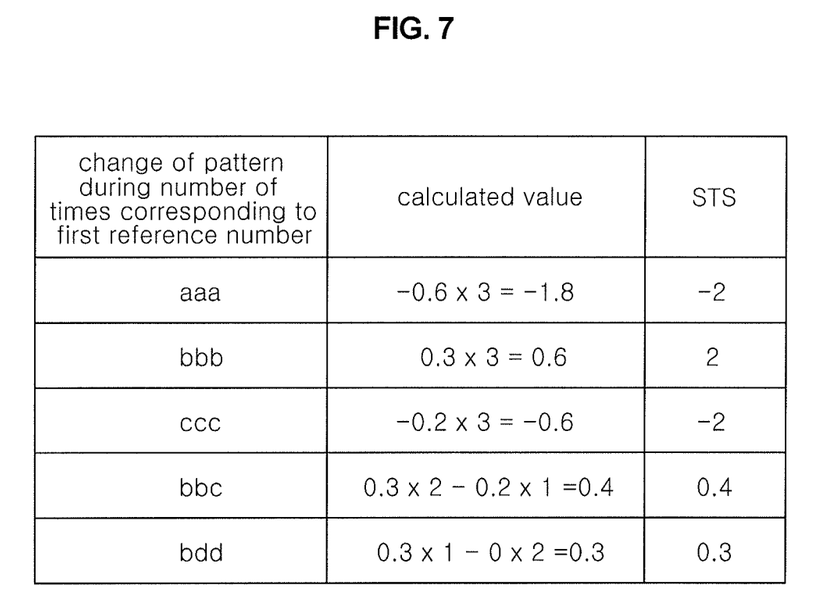
FIG. 7 is a diagram illustrating a method of determining an STS according to a change of a pattern a number of times corresponding to a first reference number according to an exemplary embodiment of the present invention.

The STS may be determined as shown in FIG. 7.

That is, when the pattern types, determined during three times corresponding to the first reference number, are not the same but different, such as bbc, bdd, or the like, the STS is determined by adding a unique pattern value for each reference pattern the number of times that it appears.

In the example of FIG. 7, the pattern value of pattern a is −0.6. The pattern value of pattern b is 0.3. The pattern value of pattern c is −0.2. The pattern value of pattern d is 0.

If the pattern types, determined during three times corresponding to the first reference number, are the same, such as aaa, bbb, or ccc, when the determined value is a positive number, the STS is determined to be 2, and when the determined value is a negative number, the STS is determined to be −2, as shown in FIG. 7. Here, "2" is the minimum value that enables the control map which is on the right side of and immediately adjacent to the current control map to be selected among the disposed control maps. "−2" is the minimum value that enables the control map which is on the left side of and immediately adjacent to the current control map to be selected.

If the pattern types, determined during the number of times corresponding to the first reference number, are bbb, this indicates that overshoot continuously occurs while selecting or shifting is performed. If the current control map is continuously used, overshoot may continuously occur. It is required to rapidly convert the current control map to a control map that decreases overshoot. If an STS is determined to be a value obtained using a unique value of each reference pattern, the STS in the example of FIG. 7 is 0.6. An LTS obtained by accumulating the STS may not be qualified to select another control map in the map selection operation S50. Accordingly, it is inevitable that overshoot continuously occurs for a while. Therefore, when the same pattern type is continuously determined and the tendency of the operation of the gear actuator (GA) is clearly determined, the present invention promptly changes the current control map to another corresponding control map and controls the gear actuator (GA).

If not all of the pattern types, determined during a predetermined number of times corresponding to the first reference number, are the same, the tendency of the operation of the gear actuator (GA) is not clear. Values obtained using the unique value of each reference pattern are used as STSs, and an LTS is obtained by accumulating the STSs. When the LTS is qualified to select another control map, the current map is changed to the other control map, and the gear actuator (GA) is controlled using the new control map.

Figure 8:
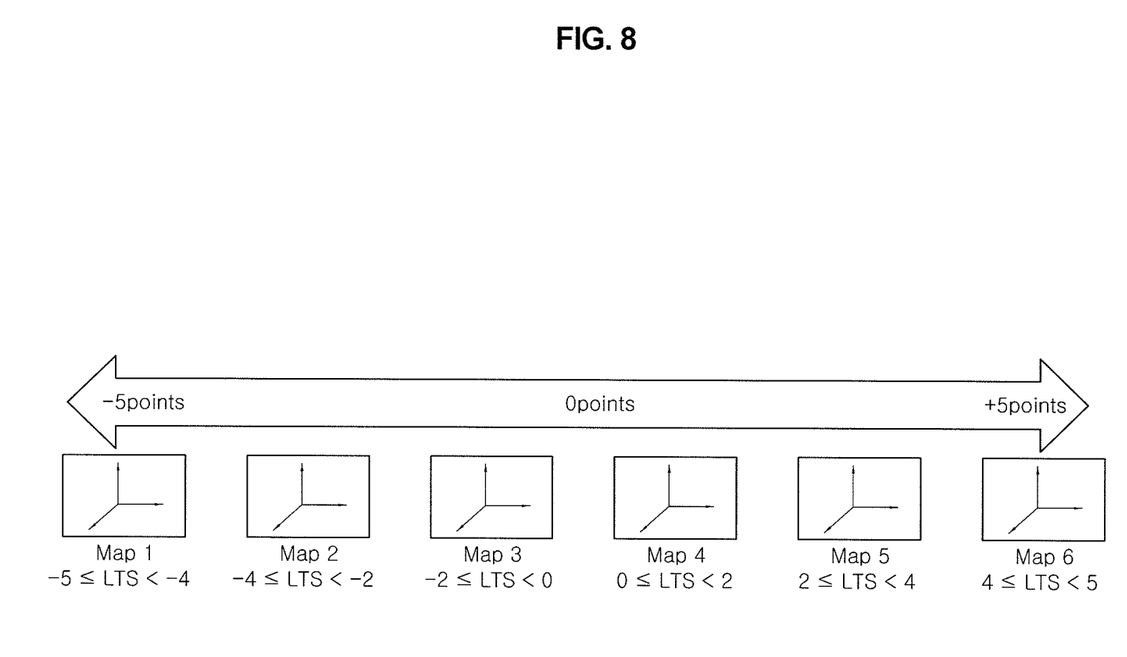
FIG. 8 is a diagram illustrating an example of selection of a control map according to an LTS in a map selection operation of the present invention.

Referring to FIG. 8, for example, if Map4 is a basic control map, different control maps are sequentially disposed on both sides of the basic control map. The control maps are disposed in a manner in which a control map having a tendency of lower responsiveness but fewer overshoots is disposed farther to the right, and a control map having a tendency of higher responsiveness but more overshoots is disposed farther to the left.

For example, as described above, when the pattern types, determined during the number of times corresponding to the first reference number, is bbb, the STS is set to 2, and the LTS is increased by 2. In the map selection operation S50, the control map disposed to the right of the current control map is selected, and thus control is performed such that overshoot may occur a relatively small number of times while the gear actuator (GA) is controlled.

That is, when the ignition of the engine (E) of the vehicle is turned on, the controller (CLR) may perform gear shifting by controlling the gear actuator (GA) using the basic control map. Subsequently, when another control map from the control maps is selected in the map selection operation S50 on the basis of the value of an LTS determined according to an exemplary embodiment of the present invention, the controller performs gear shifting by controlling the gear actuator (GA) using the selected control map. If another control map is selected since the LTS changes again, the controller controls the gear actuator (GA) according to the new control map. Accordingly, the present invention actively changes a control map used for controlling the gear actuator (GA) according to a change in the state of the vehicle.

For reference, when the ignition of the engine (E) of the vehicle is turned on and the basic control map is selected, a default value (DEFAULT), such as 0 or 1, is designated for an LTS, and subsequently, the LTS is determined by continuously adding an STS to the previous LTS every time an STS is determined because gear shifting is repeatedly performed.

Figure 9:
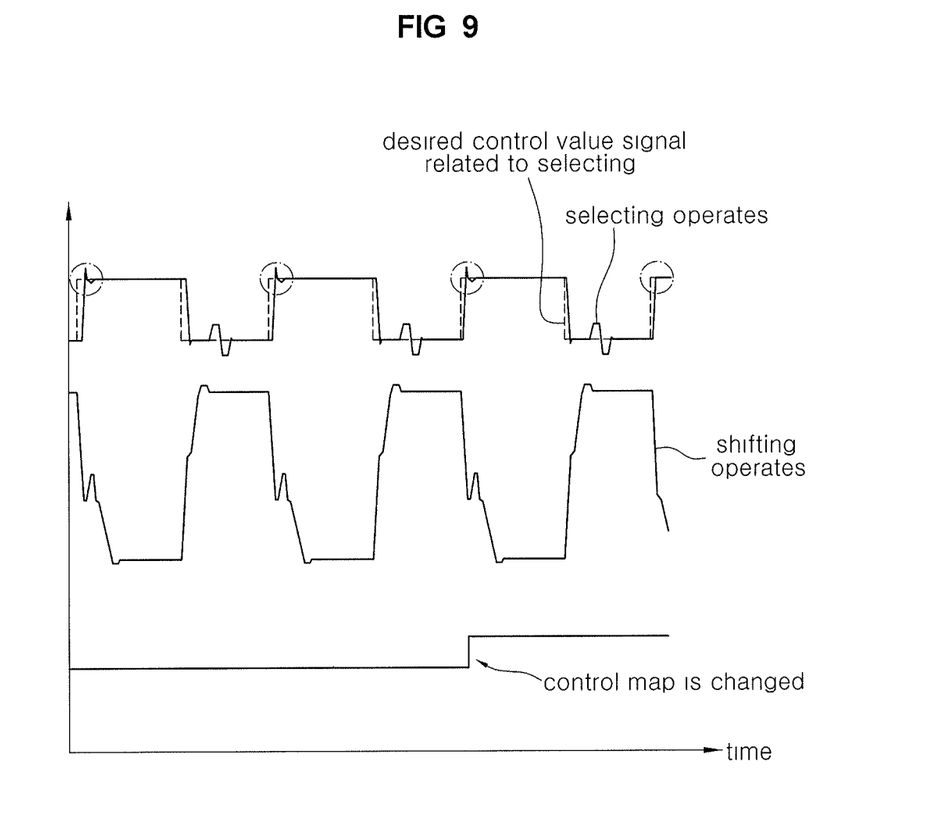
FIG. 9 is a graph illustrating the test result of a vehicle according to an exemplary embodiment of the present invention.

For reference, FIG. 9 is the test result of a vehicle to which an exemplary embodiment of the present invention is applied. While gear shifting is repeated several times, a control map is changed after overshoot occurs three times in the case of a selection operation, and thus overshoot does not occur when a selection operation is performed in the future.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a gear actuator of a transmission in a vehicle, the method comprising:
   a data collection operation in which, in a response of determining that gear shifting is performed, a controller is configured to collect data related to a change in a stroke of a shift finger over time as the gear actuator is driven;
   a data-processing operation in which the controller is configured to process the collected data;
   a type determination operation in which the controller is configured to analyze a pattern of the processed data, to determine a type of pattern from predetermined reference patterns;
   a short-term score (STS) calculation operation in which the controller is configured to repeatedly perform operations from the data collection operation to the type determination operation a number of times corresponding to a first reference number, and to determine an STS according to each pattern determined during the number of times corresponding to the first reference number;
   a map selection operation in which the controller is configured to select a control map among a plurality of control maps based on a long-term score (LTS) determined by accumulating the STS; and
   a gear-shifting operation in which the controller is configured to perform gear shifting of the transmission, using the selected controller map.

2. The method of claim 1, wherein the data-processing operation includes:
   a first processing which converts the collected data plotted on orthogonal coordinates of which a horizontal axis and a vertical axis represent a time and a stroke, respectively, wherein the horizontal axis is converted into an error axis representing a difference from a target control value for the stroke of the shift finger and the vertical axis is converted into a speed axis indicating a speed of a movement of the shift finger;
   a second processing which performs log-scale conversion of the horizontal axis obtained through the first processing; and
   a third processing which multiplies, by a weight, each of the vertical axis and the horizontal axis of data obtained by the second processing, to convert the vertical axis and the horizontal axis to have a same predetermined size.

3. The method of claim 2, wherein the analyzing the pattern includes:
   designating two predetermined points on the orthogonal coordinates on which the data processed in the data-processing operation are plotted;
   moving the two designated points using K-NN clustering; and
   comparing final locations of the two designated points with locations of predetermined reference points to determine the type of pattern.

4. The method of claim 3, wherein the moving the two designated points using the K-NN clustering is performed repeatedly a number of times corresponding to a second reference number.

5. The method of claim 3, wherein the predetermined reference points include a total of three reference points, one of the three reference points is located farthest from an origin of the orthogonal coordinates, and two remaining points of the three reference points are located in a center portion of the horizontal axis and a center portion of the vertical axis, respectively.

6. The method of claim 5,
wherein the predetermined reference patterns include four reference patterns having:
a first pattern indicating a state in which a responsiveness of the shift finger is lower than a first predetermined value and the speed of the shift finger is lower than a predetermined speed;
a second pattern, in which the responsiveness of the shift finger is higher than the first predetermined value but overshoot of the responsiveness occurs;
a third pattern, indicating a state in which an initial responsiveness of the shift finger is higher than a second predetermined value but an operation of the shift finger stops before a target stroke of the shift finger is achieved and the operation of the shift finger starts again; and
a fourth pattern, indicating a normal state in which the responsiveness of the shift finger and the overshoot of the responsiveness are optimized, and
wherein the controller is configured to compare the locations of the two designated points with the three reference points and determines a type of pattern from the four reference patterns.

7. The method of claim 1, wherein, when types of patterns, determined during repeatedly performing the operations the number of times corresponding to the first reference number, are a same, the controller is configured to determine, to be the STS, a minimum value in which a subsequent control map adjacent to a current control map is configured to be selected in the map selection operation.

8. The method of claim 7, wherein, upon determining that not all of the types of patterns, determined during repeatedly performing the operations the number of times corresponding to the first reference number, are a same, the controller is configured to determine the STS using a predetermined pattern value assigned for each reference pattern.

9. A transmission apparatus of a vehicle, the transmission apparatus comprising:
a transmission to which a shift finger is engaged;
a gear actuator connected to the shift finger; and
a controller electrically connected to the gear actuator and configured of:
collecting data associated with a change in a stroke of the shift finger over time as the gear actuator is driven;
processing the collected data;
analyzing a pattern of the processed data, to determine a type of pattern from predetermined reference patterns;
repeatedly performing collecting the data, processing the collected data, and analyzing the pattern of the processed data, a number of times corresponding to a first reference number, and to determine a short-term score (STS) according to each pattern determined during the number of times corresponding to the first reference number;
selecting a control map among plurality of control maps based on a long-term score (LTS) determined by accumulating the STS; and
performing gear shifting using the selected controller map.

10. The transmission apparatus of claim 9, wherein the processing the collected data includes:
a first processing which converts the collected data plotted on orthogonal coordinates of which a horizontal axis and a vertical axis represent a time and a stroke, respectively, wherein the horizontal axis is converted into an error axis representing a difference from a target control value for the stroke of the shift finger and the vertical axis is converted into a speed axis indicating a speed of a movement of the shift finger;
a second processing which performs log-scale conversion of the horizontal axis obtained through the first processing; and
a third processing which multiplies, by a weight, each of the vertical axis and the horizontal axis of data obtained by the second processing, to convert the vertical axis and the horizontal axis to have a same predetermined size.

11. The transmission apparatus of claim 10, wherein the analyzing the pattern includes:
designating two predetermined points on the orthogonal coordinates on which the processed data are plotted;
moving the two designated points using K-NN clustering; and
comparing final locations of the two designated points with locations of predetermined reference points to determine the type of pattern.

12. The transmission apparatus of claim 11, wherein the moving the two designated points using the K-NN clustering is performed repeatedly a number of times corresponding to a second reference number.

13. The transmission apparatus of claim 11, wherein the predetermined reference points include a total of three reference points, one of the three reference points is located farthest from an origin of the orthogonal coordinates, and two remaining points of the three reference points are located in a center portion of the horizontal axis and a center portion of the vertical axis, respectively.

14. The transmission apparatus of claim 13,
wherein the predetermined reference patterns include four reference patterns having:
a first pattern indicating a state in which a responsiveness of the shift finger is lower than a first predetermined value and the speed of the shift finger is lower than a predetermined speed;
a second pattern, in which the responsiveness of the shift finger is higher than the first predetermined value but overshoot of the responsiveness occurs;
a third pattern, indicating a state in which an initial responsiveness of the shift finger is higher than a second predetermined value but an operation of the shift finger stops before a target stroke of the shift finger is achieved and the operation of the shift finger starts again; and
a fourth pattern, indicating a normal state in which the responsiveness of the shift finger and the overshoot of the responsiveness are optimized, and
wherein the controller is configured to compare the locations of the two designated points with the three reference points and determines a type of pattern from the four reference patterns.

15. The transmission apparatus of claim 9,
wherein, when types of patterns, determined during repeatedly performing the operations the number of times corresponding to the first reference number, are a same, the controller is configured to determine, to be the STS, a minimum value in which a subsequent control map adjacent to a current control map is configured to be selected in the selecting of the control map.

16. The transmission apparatus of claim 15,
wherein, upon determining that not all of the types of patterns, determined during repeatedly performing the operations the number of times corresponding to the first reference number, are a same, the controller is configured to determine the STS using a predetermined pattern value assigned for each reference pattern.

* * * * *